(12) United States Patent
Tanimura

(10) Patent No.: US 7,366,362 B2
(45) Date of Patent: Apr. 29, 2008

(54) QPSK LIGHT MODULATOR

(75) Inventor: Daisuke Tanimura, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/471,673

(22) Filed: Jun. 21, 2006

(65) Prior Publication Data
US 2007/0003179 A1  Jan. 4, 2007

(30) Foreign Application Priority Data
Jun. 27, 2005  (JP) .................... P.2005-186405

(51) Int. Cl.
G02F 1/035 (2006.01)
H04B 10/04 (2006.01)
(52) U.S. Cl. ............... 385/1; 385/3; 398/183; 359/239
(58) Field of Classification Search .............. None
See application file for complete search history.

(56) References Cited
U.S. PATENT DOCUMENTS
6,377,620 B1 * 4/2002 Ozluturk et al. ............ 375/235
7,116,460 B2 * 10/2006 Griffin ....................... 359/245

FOREIGN PATENT DOCUMENTS

| EP | 1 004 920 A2 | 5/2000 |
| JP | 2004-516743 A | 6/2004 |
| WO | 03/049333 A1 | 6/2003 |

* cited by examiner

Primary Examiner—Sung Pak
Assistant Examiner—Omar Rojas
(74) Attorney, Agent, or Firm—Sughrue Mion, PLLC

(57) ABSTRACT

The present invention provides a light transmitter with a stable IQ amplitude ratio relative to the characteristic change of a modulating system. The QPSK light modulator of the present invention includes a laser light source for outputting light; an optical demultiplexer for inputting light and branching it in two directions; two optical phase modulators for inputting respectively one of the branched lights; a π/2 phase shifter provided before or after one of the two optical phase modulators; an encoder for inputting I and Q signals into the optical phase modulators through drivers; and an optical multiplexer for synthesizing the outputs of the two optical phase modulators into a multiplexed, modulated light. The QPSK light modulator includes another optical demultiplexer after the optical multiplexer and a correcting section for correcting amplitude unbalance generated when light passes between the optical demultiplexers, by using output from the second optical demultiplexer.

9 Claims, 6 Drawing Sheets

RESULTANT VECTOR

SINCE MODULATION (≈PHASE MODULATION) IS APPLIED IN TANGENTIAL DIRECTION OF CIRCLE, OPTICAL AMPLITUDE IS NOT VARIED

SUPERIMPOSITION OF AMPLITUDE MODULATED SIGNAL ON I AND Q

FIG. 4A 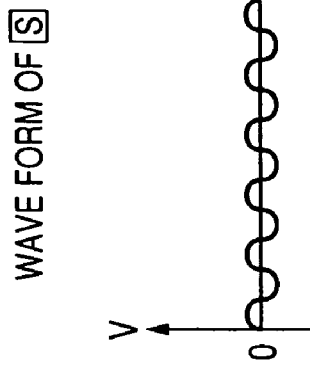 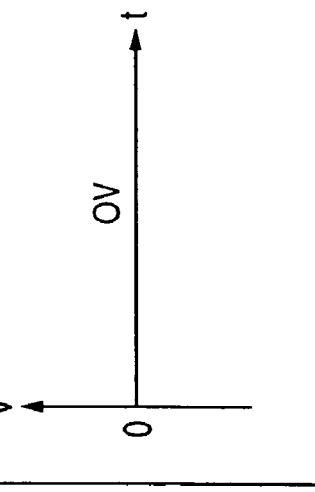
FIG. 4B
FIG. 4C
WAVE FORM OF R
WAVE FORM OF S
WAVE FORM OF T
WAVE FORM IN CASE OF FIG. 3
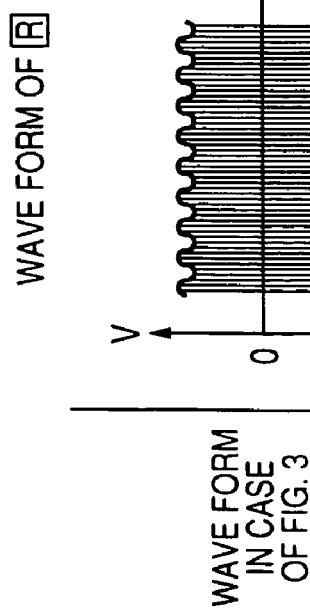
AM WAVE FORM
DC VOLTAGE WHOSE VALUE IS NOT 0
WAVE FORM IN CASE OF FIG. 2B
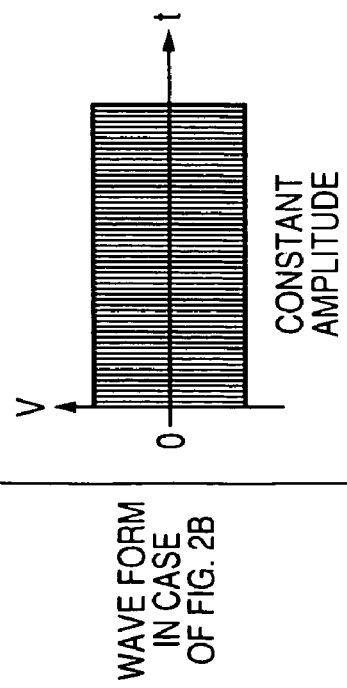
CONSTANT AMPLITUDE
DC
0V

QPSK VECTOR (CONSTELLATION)

QPSK VECTOR WHEN AMPLITUDE BALANCE
OF I-Q COLLAPSES (EXAMPLE : $|I|<|Q|$)

QPSK LIGHT MODULATOR

This application claims foreign priority based on Japanese Patent application No. 2005-186405, filed Jun. 27, 2005, the content of which is incorporated herein by reference in its entirety.

BACKGROUND OF THE INVENTION

1. Field of the Invention

The present invention relates to a QPSK (Quadrature Phase Shift Keying) light transmitting section used in an optical communication system of a wavelength division multiplex (WDM) type and more particularly to a QPSK light modulator that compensates the amplitudes of an I component and a Q component of the optical output of a light modulating section forming the light transmitting section so that the amplitudes are equal.

2. Description of the Related Art

For a description of an optical communication system of the wavelength division multiplex (WDM) type using a QPSK light transmitting section, see JP-A-2004-516743.

FIG. 5 is a block diagram of main parts showing one example of the QPSK light transmitting section described in JP-A-2004-516743. In FIG. 5, the modulator of an optical phase transition and modulation device is shown for encoding two 20 Gbit/s NRZ (Non Return to Zero) data streams d1(t) and d2(t) on a single optical carrier wave. This modulator is used, for instance, as part of the transmitter in a WDM optical communication system having modulators for each WDM wavelength channel.

The modulator has a semiconductor laser 1 (laser light source) that needs a stable optical output for a prescribed wavelength that is, for instance, a distributed feedback type (DFB) and the laser also has a constant amplitude, a constant frequency, a constant phase and a single frequency. The laser 1 generates the non-modulated optical output of a selected wavelength (ordinarily, a WDM wavelength channel).

Light [A] from the laser 1 is divided into two parts [B] and [C] by an optical demultiplexer 2. In the illustrated example, light [C] is sent to optical phase modulator 4b via a π/2 phase shift section 3. The optical phase modulators 4a and 4b are respectively formed so that a phase is selectively modulated by 0 or π radian depending on the optical phase modulators in accordance with binary (bipolar) NRZ driving voltages VI(t) and VQ(t).

The optical phase modulators 4a and 4b are respectively formed with, for instance, gallium arsenide or lithium niobate. The optical phase modulators 4a and 4b cannot have a substantial influence on the amplitude (strength) of the optical signal and need to operate as optical phase modulators. To realize this, bias is applied respectively to the optical phase modulators when there is no driving voltage so as to minimize a light transmission. The optical phase modulators are respectively driven when the driving voltages VI (t), VQ (t)=±Vp, and a sudden phase shift is applied to the optical phase modulators while the amplitude modulation is kept minimized. The two phase modulators 4a and 4b have matched delay (phase characteristics) sections.

The optical phase modulators 4a and 4b serve to change the phase of an input light by an electric signal and carry out a binary modulation of phases 0(rad) and π(rad) in the case of a QPSK modulation.

The optical output I[J] of the optical phase modulator 4a and the optical output Q[K] of the optical phase modulator 4b are combined by an optical multiplexer 9 to have a multiplexed and modulated optical output [L].

The modulation patterns (electric signals) of the optical phase modulators 4a and 4b are generated in an IQ encoder 6 and signals are both amplified and amplitude-adjusted by drivers 7a and 7b so as to have a sufficient amplitude for driving the optical phase modulators 4a and 4b.

FIG. 6 shows a vector notation (constellation diagram) of synthesized modulated optical output [L]. The optical output [J] from the optical phase modulator 4a in FIG. 5 corresponds to I and the optical output [K] from the optical phase modulator 4b corresponds to Q. By respectively changing the I and Q components by 0° and 180°, four patterns of combinations of vectors are formed and the vectors of the IQ synthesized signal are shown by the symbol x.

FIG. 6 shows an ideal constellation since the phases of I and Q components are orthogonal and their amplitudes are equal.

However, a light module such as optical phase modulators 4a and 4b which form a light transmitter or an IQ encoder or a high frequency electric module have large characteristic changes due to temperature or an elapse of time. Accordingly, a problem arises in that a difference is generated between the amplitudes of the optical outputs I and Q.

FIG. 7 shows a state where there is a difference between the amplitudes of optical outputs I and Q such that the amplitude balance between I and Q has collapsed to yield a relation of |I|<|Q|. Such a phenomenon is hypothesized to arise because of IQ transfer differences in the optical demultiplexer, the π/2 phase shifter, the optical phase modulators, and the optical multiplexer, or because of an unevenness in gain characteristics between the driver 7a and driver 7b affects the amplitude difference between I and Q.

As described above, when the constellation deteriorates, it becomes harder for a receiving side (not shown in the drawing) to separate the four symbol positions, and the error rate is worsened and communication quality deteriorates.

SUMMARY OF THE INVENTION

The present invention provides a light transmitter that provides a stable IQ amplitude ratio relative to the characteristic change of a modulating system.

To achieve such an object, a QPSK light modulator of the present invention comprises a light source for outputting light having a constant wavelength; a first optical demultiplexer into which the light from the light source is inputted and which branches the light in two directions; a first optical phase modulator into which one of the branched lights is inputted and a second optical phase modulator into which the other of the branched lights is inputted; a π/2 phase shift section provided front stage or rear stage of either the first optical phase modulator or the second optical phase modulator; an encoder that outputs an I signal and a Q signal which are inputted into the first optical phase modulator and the second optical phase modulator through drivers respectively; and an optical multiplexer for multiplexing the outputs of the first optical phase modulator and second optical phase modulator to output a multiplexed and modulated light; wherein the QPSK light modulator includes a second optical demultiplexer provided rear stage of the optical multiplexer and a correcting section for correcting an amplitude unbalance in an optical signal generated in a modulating system from the first optical demultiplexer to the second optical demultiplexer, by using one of the outputs of the second optical demultiplexer.

In the QPSK light modulator of the present invention, the correcting section of the amplitude unbalance includes a first signal adder for adding a first controlling signal to the I signal, a second signal adder for adding a second controlling signal to the Q signal, a negative feedback section for feeding back one of the outputs from the second optical demultiplexer to either the first optical phase modulator or second optical phase modulator and an amplitude varying section for varying the amplitude of an output signal from the negative feedback section, and the signal from the amplitude varying section is added to either the first signal adder or second signal adder.

In the QPSK light modulator of the present invention, the negative feedback section includes a photoelectric converter into which one of the outputs of the second optical demultiplexer is inputted, a superimposed signal detecting section for detecting the amplitude component of the first controlling signal or the second controlling signal that is superimposed on the output of the photoelectric converter and a servo section for controlling the output of the amplitude varying section so that the amplitude component of the first controlling signal or the second controlling signal is minimized in accordance with the signal of the superimposed signal detecting section.

In the QPSK light modulator of the present invention, the superimposed signal detecting section includes an AM wave detector and an AM wave detecting circuit into which the output from the photoelectric converter is inputted and which detects an AM wave.

In the QPSK light modulator of the present invention, the servo section is an integrating circuit.

In the QPSK light modulator of the present invention, the first controlling signal and the second controlling signal are low frequency signals whose phases are different from each other by 180°.

As apparent from the above-description, according to the present invention, the QPSK light modulator includes a second optical demultiplexer placed at the rear stage of the optical multiplexer and a correcting section for correcting the amplitude unbalance of the optical signal generated in the modulating system between the first optical demultiplexer and the second optical demultiplexer, wherein the correcting section uses one of the outputs from the second optical demultiplexer.

The correcting section of the amplitude unbalance includes a first signal adder for adding the first controlling signal to the I signal, a second signal adder for adding the second controlling signal to the Q signal, a negative feedback section for sending back one of the outputs from the second optical demultiplexer to either the first or second optical phase modulators, an amplitude varying section for varying the amplitude of an output signal from the negative feedback section, wherein the signal from the amplitude varying section is added to either the first or second signal adders.

The negative feedback section includes a photoelectric converter for inputting one of the outputs of the second optical demultiplexer, a superimposed signal detecting section for detecting the amplitude component of the controlling signal superimposed on the output of the photoelectric converter, and a servo section including an integrating circuit for controlling the output of the amplitude varying section so that the amplitude component of the controlling signal is minimized in accordance with the signal of the superimposed signal detecting section.

The superimposed signal detecting section includes an AM wave detector and an AM wave detecting circuit for inputting the output from the photoelectric converter to detect an AM wave.

Since the first controlling signal and the second controlling signal are low frequency signals whose phases are different from each other by 180°, a QPSK light modulator having a stable IQ amplitude ratio relative to the characteristic change of the modulating system can be realized.

BRIEF DESCRIPTION OF THE DRAWINGS

FIGS. 4A, 4B and 4C show waveforms of outputs from the respective parts that are parts of the correcting section for correcting an amplitude unbalance.

DESCRIPTION OF THE PREFERRED EMBODIMENTS

Figure 1:
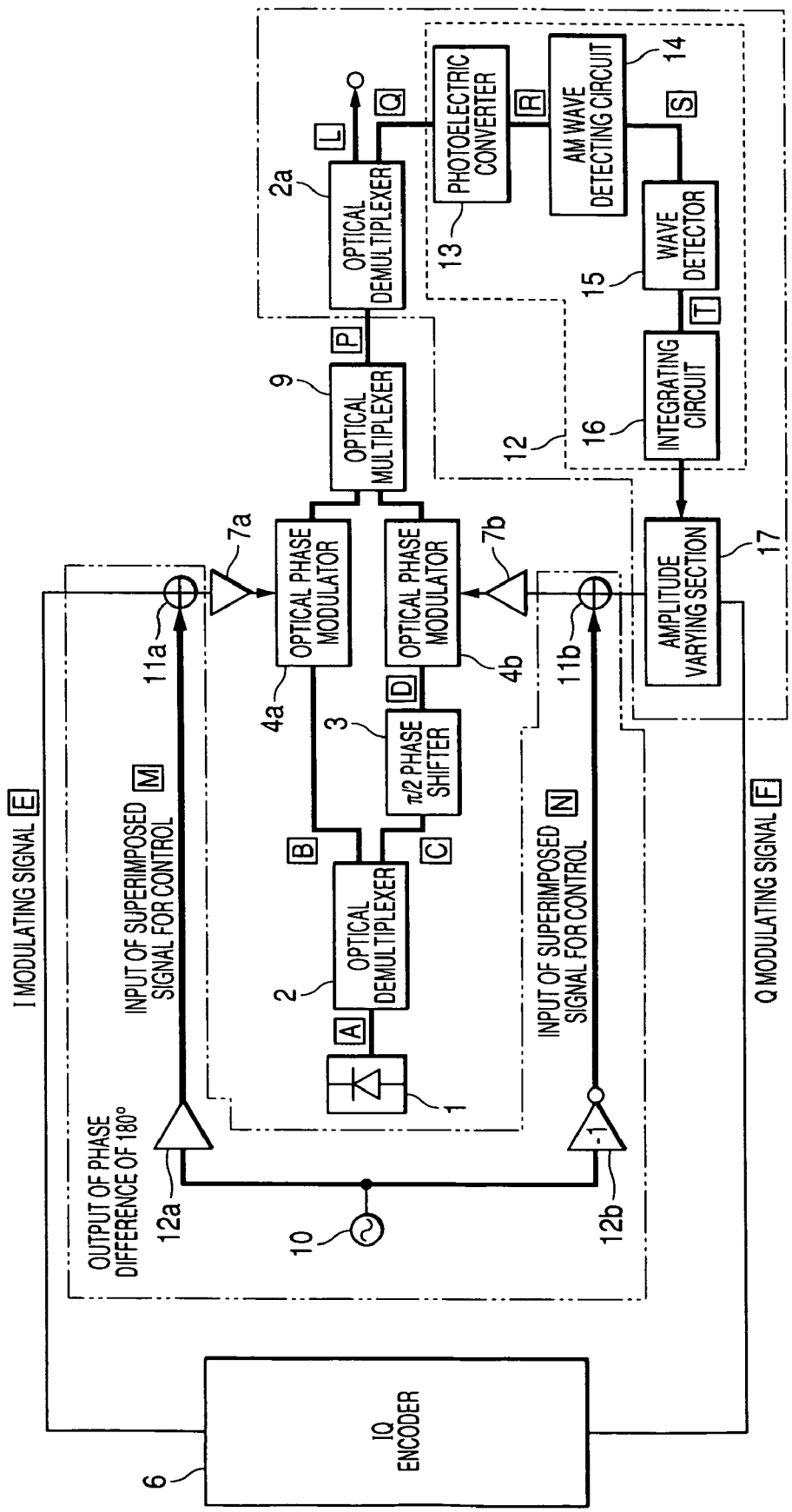
FIG. 1 is a block diagram of a QPSK light modulator showing one example of an embodiment of the present invention.
Figure 5:
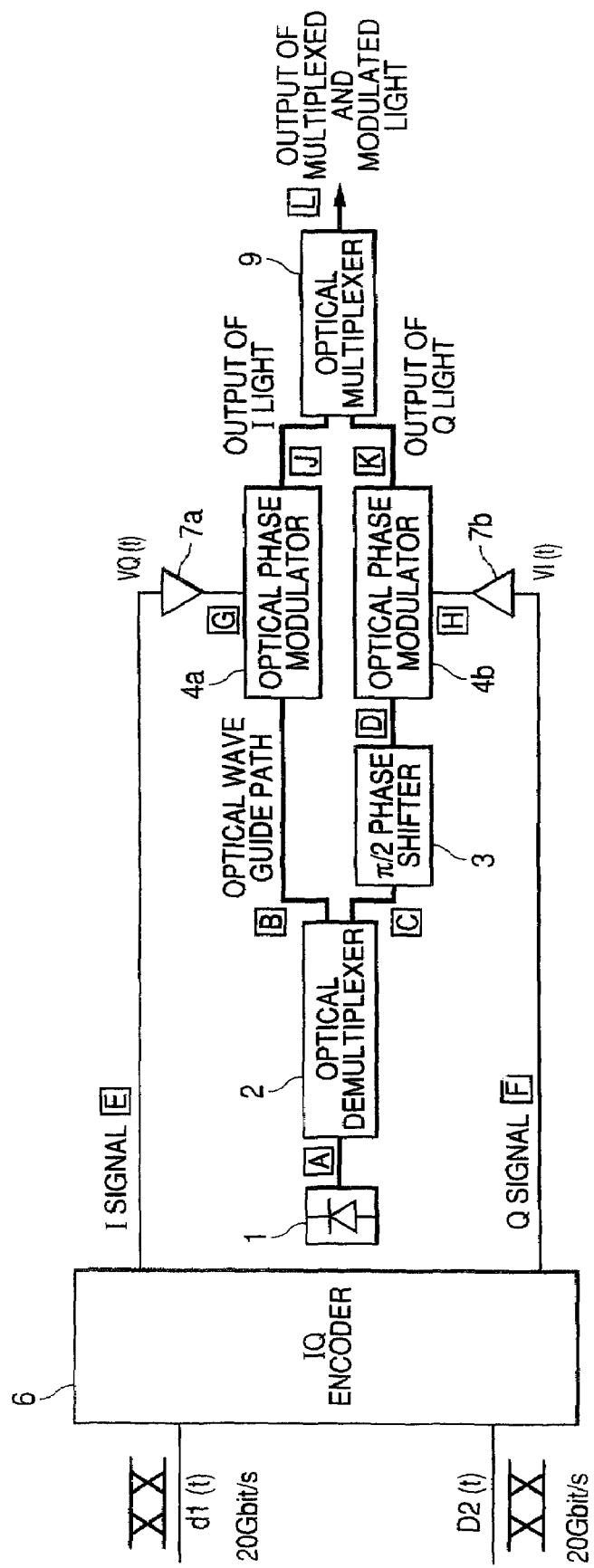
FIG. 5 is a block diagram of a usual QPSK light modulator.

FIG. 1 is a block diagram of the main parts that show one example of an embodiment of the present invention. An explanation of the elements in FIG. 1 which are designated by the same reference numerals as those of the related example shown in FIG. 5 is omitted. Reference numeral 10 designates a low frequency signal generating section. Controlling superimposed signals generated by the low frequency signal generating section 10 are inputted to signal adders 11a and 11b provided front stage of drivers 7a and 7b, then added to an I modulating signal [E] and a Q modulating signal [F] and respectively inputted to optical phase modulators 4a and 4b through the drivers 7a and 7b.

The controlling superimposed signals are amplified by amplifiers 12a and 12b at front stages of signal adders 11a and 11b. The amplifier 12b has an inverter function so that its signals are outputted in a state that the phases are different from each other by 180°.

The outputs of optical phase modulators 4a and 4b are combined in optical multiplexer 9 like the related example shown in FIG. 5. The synthesized optical wave is inputted to an optical demultiplexer 2a. One signal [L] is transmitted to a light receiver not shown in the drawings and the other signal [Q] is inputted to negative feedback section 12 including a photoelectric converter 13, an AM wave detecting circuit 14, a wave detector 15 and an integrating circuit 16. An output thereof is then inputted to an amplitude varying section 17. An output from the amplitude varying section 17 is inputted into the signal adder 11b together with controlling superimposed signal [N] and inputted to optical phase modulator 4b via the driver 7b.

The AM wave detecting circuit 14 and the wave detector 15 function as superimposed signal detecting section and the integrating circuit 16 functions as a servo section.

A ratio of amplitude component of [E] to amplitude component of [M] in adding signal [G] is made to equal the ratio of amplitude component of F to amplitude component of [N] in adding signal [H].

Figure 2B:
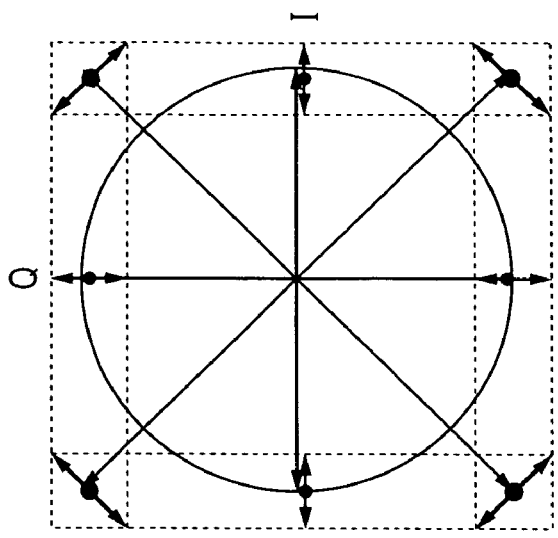
FIGS. 2A and 2B are diagrams showing the loci of ends of vectors of an I modulated signal and vectors of a Q modulated signal on which low frequency signals are superimposed.
Figure 2A:
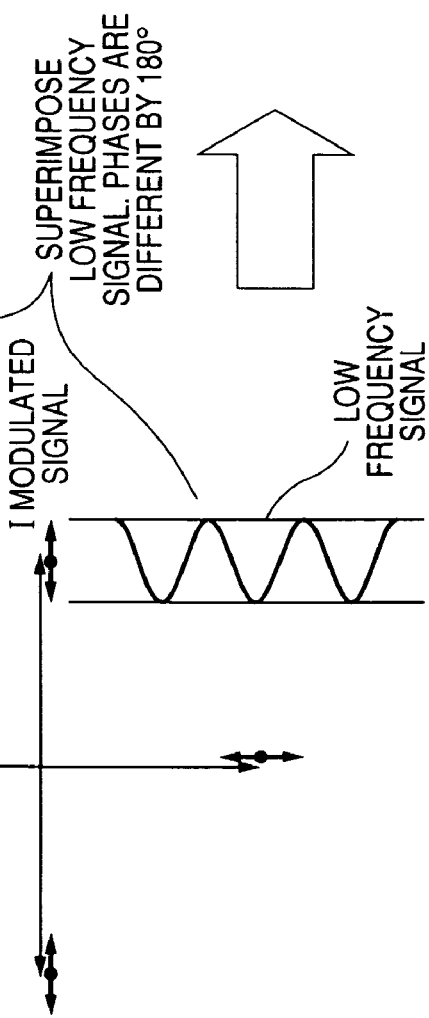

FIG. 2A shows a locus using arrow marks of an end of the vector of an I modulated signal on which a low frequency signal is superimposed and of the vector of a Q modulated signal on which a low frequency signal is superimposed. As shown in the drawing, the phases of the low frequency signals are different from each other by 180°.

FIG. 2B shows the resultant vectors of the vectors shown in FIG. 2A. Here, since the signals superimposed on the I signal and the Q signal are different from each other by 180°, the loci of the resultant vectors are in directions tangential to the circle. Assuming that the superimposed signals are relatively small, it is clear that the resultant vectors hardly change in the direction of the amplitude.

Figure 3:
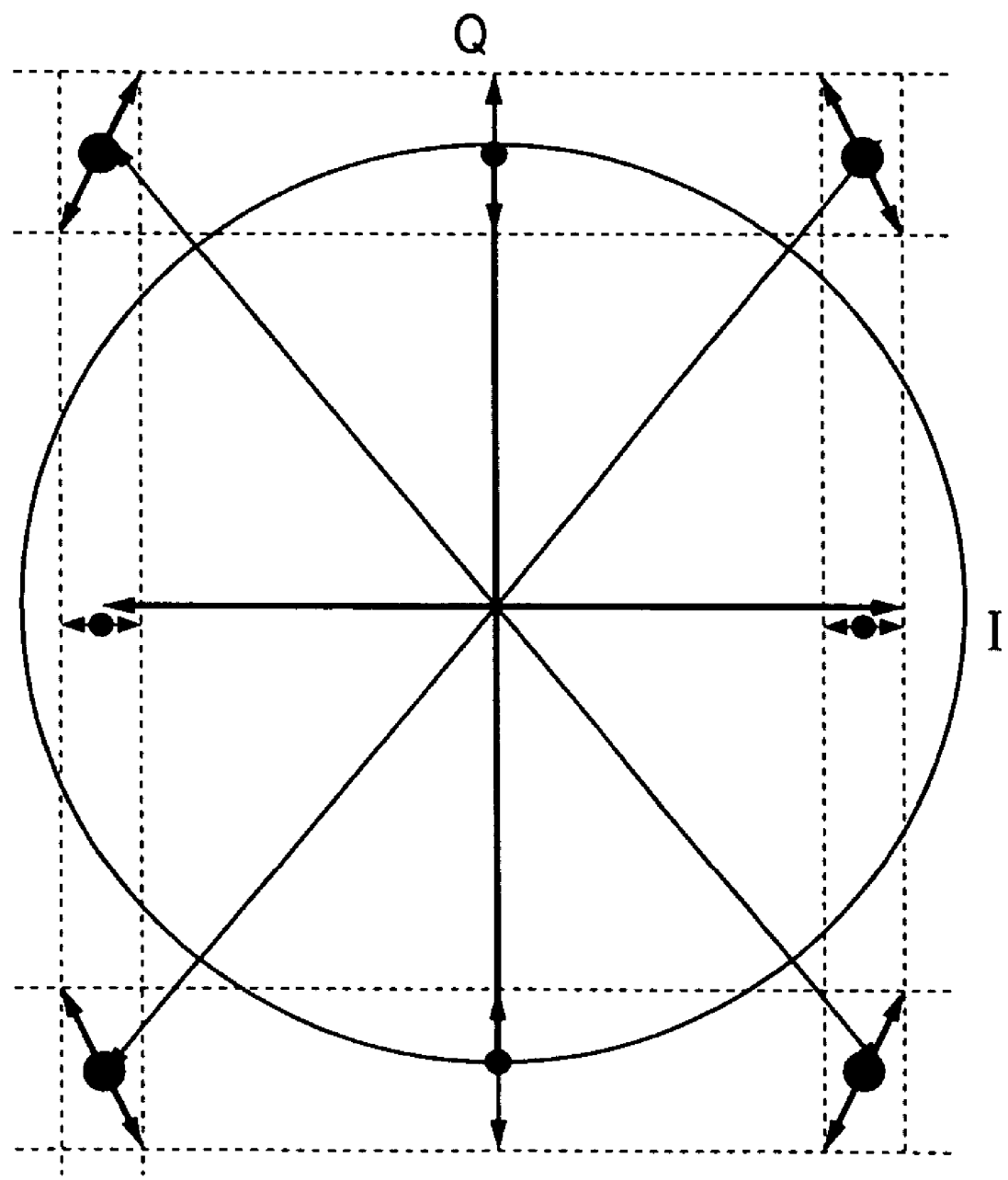
FIG. 3 shows resultant vectors when the phase balance collapses.

FIG. 3 shows resultant vectors when the phase balance collapses. When optical amplitude varies, this variation can be extracted by detecting an AM wave of a superimposed wave.

FIG. 4 shows output wave forms from the respective parts that form a part of the negative feedback section 12 of the correcting section for correcting an amplitude unbalance of the present invention. In the drawing, FIG. 4A shows a wave form of an output [R] from photoelectric converter 13, FIG. 4B shows the wave form of an output [S] of AM wave detecting circuit 14 and FIG. 4C shows the wave form of an output [T] of the wave detector. The upper row shows the wave forms of the resultant vector shown in FIG. 3 and the lower column shows waveforms of the resultant vector shown in FIG. 2B.

As described above, the construction of the present invention includes a second optical demultiplexer provided rear stage of the optical multiplexer, a first signal adder for adding the first controlling signal to the I signal, a second signal adder for adding the second controlling signal to the Q signal, a negative feedback section for feeding back one of the outputs from the second optical demultiplexer to either the first or second optical phase modulators, an amplitude varying section that varies the amplitude of an output signal from the negative feedback section, and the signal from the amplitude varying section is added to either the first or second signal adders. The negative feedback section includes a photoelectric converter for inputting one of the outputs of the second optical demultiplexer, an AM wave detecting circuit for detecting the controlling signal superimposed on the output of the photoelectric converter, a wave detector, and an integrating circuit. Since the first controlling signal and the second controlling signal are low frequency signals whose phases are different from each other by 180°, the QPSK light modulator having a stable IQ amplitude ratio relative to the characteristic change of the modulating system can be realized.

In the above-description, the specific and preferred embodiment is merely exemplified for the purpose of explaining the present invention and for showing an example. Thus, the integrating circuit used in the negative feedback section may be comprised of other parts having the same function.

Accordingly, the present invention is not limited to the above-described embodiment, and changes and modifications may be included within the scope of the present invention without departing from the essence thereof.

[FIG. 1]
2 optical demultiplexer
2a optical demultiplexer
3 π/2 phase shifter
4a, 4b optical phase modulator
6 IQ encoder
9 optical multiplexer
13 photoelectric converter
14 AM wave detecting circuit
15 wave detector
16 integrating circuit
17 amplitude varying section
E I modulating signal
F Q modulating signal
M input of superimposed signal for control
N input of superimposed signal for control
1 output of phase difference of 180°

[FIG. 2A]
1 superimposition of amplitude modulated signal on I and Q
2 low frequency signal
3 Q modulated signal
4 I modulated signal
5 superimpose low frequency signal. phases are different by 180°.

[FIG. 2B]
6 resultant vector
7 Since modulation (≈phase modulation) is applied in tangential direction of circle, optical amplitude is not varied.

Figure 7:
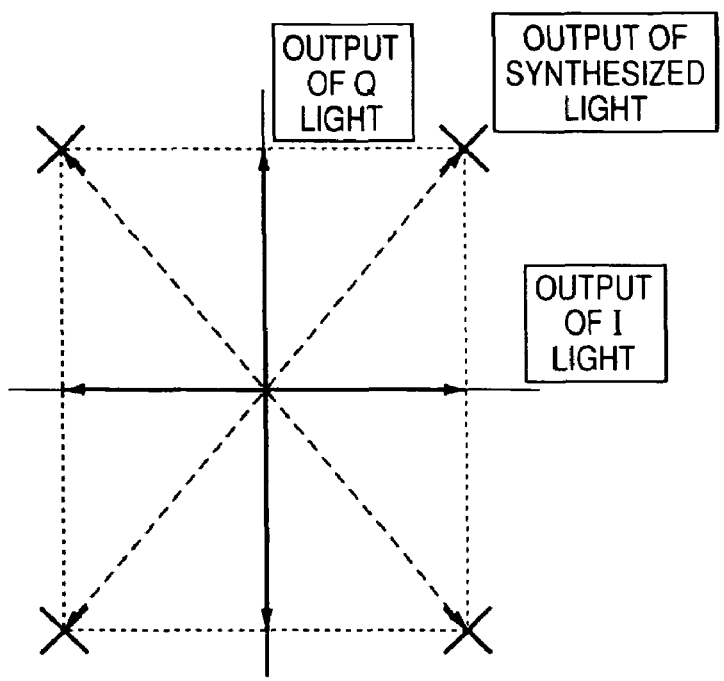
FIG. 7 is a diagram showing when a difference appears in the amplitude of optical outputs of I and Q.

[FIG. 4A]
1 wave form of R
5 AM wave form
8 constant amplitude
4 wave form in case of FIG. 3
7 wave form in case of FIG. 2B

[FIG. 4B]
2 wave form of S

[FIG. 4C]
3 wave form of T
6 DC voltage whose value is not 0

[FIG. 5]
E I signal
F Q signal
1 optical wave guide path
L output of multiplexed and modulated light
J output of I light
K output of Q light
2 optical demultiplexer
3 π/2 phase shifter
4a, 4b optical phase modulator
6 IQ encoder
9 optical multiplexer

Figure 6:
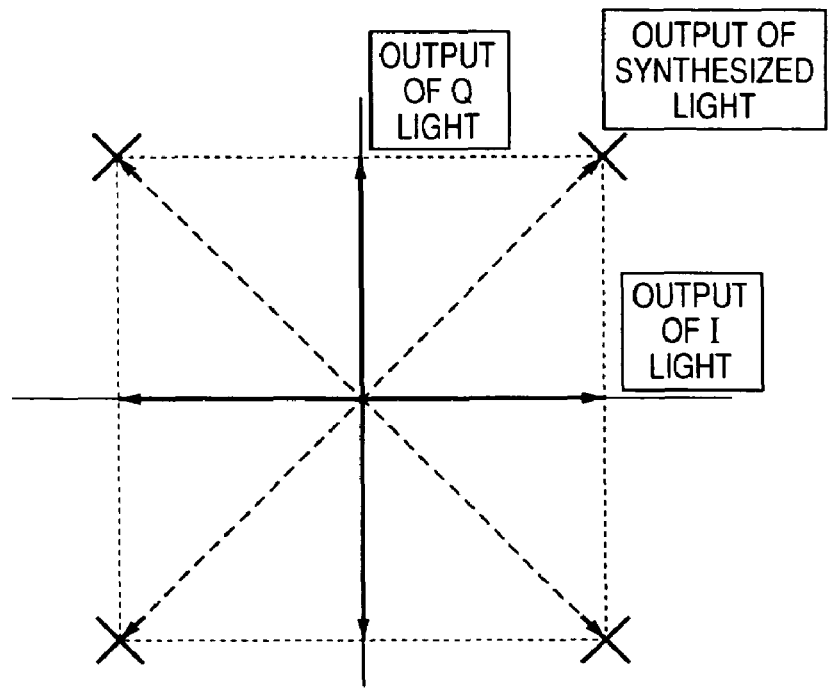
FIG. 6 is a diagram of an ideal constellation.

[FIG. 6]
1 QPSK vector (constellation)
2 output of Q light
3 output of synthesized light
4 output of I light

[FIG. 7]
2 output of Q light
3 output of synthesized light
4 output of I light
5 QPSK vector when amplitude balance of I-Q collapses (example: |I|<|Q|)

What is claimed is:

1. A QPSK light modulator comprising:
   a light source for outputting a light having a constant wavelength;

a first optical demultiplexer into which the light from the light source is inputted, and which branches the light in two directions;

a first optical phase modulator into which one of the branched lights is inputted;

a second optical phase modulator into which the other of the branched lights is inputted;

a π/2 phase shift section provided at a front stage or a rear stage of either the first optical phase modulator or the second optical phase modulator;

an encoder that outputs an I signal and a Q signal which are inputted into the first optical phase modulator and the second optical phase modulator through drivers respectively;

an optical multiplexer for multiplexing outputs of the first optical phase modulator and the second optical phase modulator to output a multiplexed and modulated light;

a second optical demultiplexer provided at a rear stage of the optical multiplexer; and a correcting section for correcting an amplitude unbalance in an optical signal generated in a modulating system from the first optical demultiplexer to the second optical demultiplexer, by using one of the outputs of the second optical demultiplexer, wherein the correcting section includes:

a first signal adder for adding a first controlling signal to the I signal;

a second signal adder for adding a second controlling signal to the Q signal;

a negative feedback section for feeding back the one of the outputs from the second optical demultiplexer to either the first optical phase modulator or the second optical phase modulator; and an amplitude varying section for varying an amplitude of an output signal from the negative feedback section, wherein the signal from the amplitude varying section is added to either the first signal adder or the second signal adder.

2. The QPSK light modulator according to claim 1, wherein the negative feedback section includes:

a photoelectric converter into which the one of the outputs of the second optical demultiplexer is inputted;

a superimposed signal detecting section for detecting an amplitude component of the first controlling signal or the second controlling signal that is superimposed on an output of the photoelectric converter; and a servo section for controlling an output of the amplitude varying section so that the amplitude component of the first controlling signal or the second controlling signal is minimized based on the signal of the superimposed signal detecting section.

3. The QPSK light modulator according to claim 2, wherein the superimposed signal detecting section includes a wave detector and an AM wave detecting circuit into which the output from the photoelectric converter is inputted and which detects an AM wave.

4. The QPSK light modulator according to claim 2, wherein the servo section is an integrating circuit.

5. The QPSK light modulator according to claim 1, wherein the first controlling signal and the second controlling signal are low frequency signals whose phases are different from each other by 180°.

6. The QPSK light modulator according to claim 2, wherein the first controlling signal and the second controlling signal are low frequency signals whose phases are different from each other by 180°.

7. The QPSK light modulator according to claim 1, wherein the first controlling signal and the second signal are generated by a low frequency signal generating section.

8. The QPSK light modulator according to claim 1, where in the first controlling signal is amplified by a first amplifier and the second controlling signal is amplified by a second amplifier.

9. The QPSK light modulator according to claim 8, wherein the second amplifier has an inverter function.

* * * * *